United States Patent
Roesler et al.

[11] Patent Number: 5,919,860
[45] Date of Patent: Jul. 6, 1999

[54] AQUEOUS POLYURETHANE/UREA DISPERSIONS CONTAINING ALKOXYSILANE GROUPS

[75] Inventors: Richard R. Roesler, Wexford; Lyuba K. Gindin, Pittsburgh, both of Pa.

[73] Assignee: Bayer Corporation, Pittsburgh, Pa.

[21] Appl. No.: 08/992,551

[22] Filed: Dec. 17, 1997

[51] Int. Cl.$^6$ ................ C08J 3/00; C08K 3/20; C08L 75/00; C08L 83/00
[52] U.S. Cl. .......... 524/838; 524/588; 524/591; 524/839; 524/840; 428/423.1
[58] Field of Search ............... 524/588, 591, 524/838, 839, 840; 428/423.1

[56] References Cited

U.S. PATENT DOCUMENTS

| | | | |
|---|---|---|---|
| 3,479,310 | 11/1969 | Dieterich et al. | 260/29.2 |
| 3,870,684 | 3/1975 | Witt et al. | 260/75 NH |
| 4,066,591 | 1/1978 | Scriven et al. | 260/29.2 TN |
| 4,092,286 | 5/1978 | Noll et al. | 260/29.2 TN |
| 4,108,814 | 8/1978 | Reiff et al. | 260/29.2 TN |
| 4,203,883 | 5/1980 | Hangauer, Jr. | 260/29.2 TN |
| 4,237,264 | 12/1980 | Noll et al. | 528/67 |
| 4,238,378 | 12/1980 | Markusch et al. | 260/29.2 TN |
| 4,408,008 | 10/1983 | Markusch | 524/591 |
| 5,041,494 | 8/1991 | Franke et al. | 524/588 |
| 5,354,808 | 10/1994 | Onwumere et al. | 524/837 |
| 5,554,686 | 9/1996 | Frisch, Jr. et al. | 524/588 |
| 5,756,751 | 5/1998 | Schmalstieg et al. | 548/110 |

*Primary Examiner*—Patrick D. Niland
*Attorney, Agent, or Firm*—Joseph C. Gil; Thomas W. Roy

[57] ABSTRACT

The present invention relates to aqueous polyurethane/urea dispersions wherein the polyurethane/ureas contain 0.5 to 6% by weight, based on the weight of the polyurethane/ureas, of alkoxysilane groups (calculated as Si, MW 28), which have been incorporated by the reaction of isocyanate groups with compounds containing alkoxysilane groups and secondary amino groups other than aspartate groups. The present invention also relates to a process for preparing these aqueous polyurethane/urea dispersions and to coatings prepared from these aqueous polyurethane/urea dispersions.

17 Claims, No Drawings

AQUEOUS POLYURETHANE/UREA DISPERSIONS CONTAINING ALKOXYSILANE GROUPS

BACKGROUND OF THE INVENTION

1. Field of the Invention

The present invention relates to aqueous polyurethane/urea dispersions containing alkoxysilane groups incorporated through secondary amino groups, to a process for preparing these dispersions and to their use for the production of coatings which have improved properties, such as solvent resistance.

2. Description of the Prior Art

The production of linear or cross-linked aqueous polyurethane-urea dispersions is known as shown by U.S. Pat. Nos. 3,479,310; 4,066,591; 4,092,286; 4,108,814; 4,237,264; and 4,238,378 which disclose linear polyurethane-ureas and U.S. Pat. Nos. 3,870,684 4,203,883 and 4,408,008, which disclose cross-linked polyurethane-ureas. The aqueous polyurethane-urea dispersions may be used for a wide range of commercial applications such as adhesives or coatings for various substrates including textile fabrics, plastic, wood, glass fibers and metals. Chemical resistance, abrasion resistance, toughness, tensile strength, elasticity and durability are among the many desirable properties of these coatings. In some cases these properties of coatings prepared from aqueous polyurethane-urea dispersions have equaled or even surpassed the performance levels of coatings obtained from solvent-based polyurethane lacquers.

Regardless of the property level which may be obtained for coatings prepared from commercial polyurethane-urea dispersions, there is always a further need to increase these properties, in particular water resistance, solvent resistance, weather resistance and physical properties such as abrasion resistance.

It is an object of the present invention to provide aqueous polyurethane/urea dispersions which can be used to prepare coatings which possess these properties and still retain the other valuable properties of aqueous polyurethane dispersions.

This object may be achieved in accordance with the present invention by preparing the aqueous polyurethane/urea dispersions which contain alkoxysilane groups incorporated through secondary amino groups.

Aqueous polyurethane dispersions containing alkoxysilane groups and known and disclosed, e.g., in U.S. Pat. Nos. 5,041,494, 5,354,808 and 5,554,686. However, in these applications the alkoxysilane groups are not incorporated through secondary amino groups as required by the present invention. An advantage of incorporating the alkoxysilane groups in accordance with the present invention is that stable dispersions can be obtained at higher siloxane group contents than when the siloxane groups are incorporated through primary amino groups.

SUMMARY OF THE INVENTION

The present invention relates to aqueous polyurethane/urea dispersions wherein the polyurethane/ureas contain 0.5 to 6% by weight, based on the weight of the polyurethane/ureas, of alkoxysilane groups (calculated as Si, MW 28), which have been incorporated by the reaction of isocyanate groups with compounds containing alkoxysilane groups and secondary amino groups other than aspartate groups.

The present invention also relates to a process for preparing these aqueous polyurethane/urea dispersions by A) preparing NCO prepolymers by reacting organic polyisocyanates with high molecular weight polyols, optionally low molecular weight isocyanate-reactive compounds and optionally isocyanate-reactive compounds containing hydrophilic groups and B) reacting the NCO prepolymers with compounds containing alkoxysilane groups and secondary amino groups and optionally other amine chain extenders either prior to, during or after dispersing the NCO prepolymer in water, wherein the compounds containing alkoxysilane groups and secondary amino groups are present in an amount sufficient to incorporate 0.5 to 6% by weight, based on the weight of the polyurethane/urea, of alkoxysilane groups (calculated as Si, MW 76).

Finally, the present invention relates to coatings prepared from these aqueous polyurethane/urea dispersions.

DETAILED DESCRIPTION OF THE INVENTION

In accordance with the present invention the term "polyurethane/urea" means polymers containing urethane and/or urea groups.

The aqueous polyurethane/urea dispersions according to the invention may be prepared by either a one-step or a two-step process, preferably by a two-step process. In the one-step process all of the components are mixed together and reacted in one step. In the two-step process an NCO prepolymer is formed in the first step and is subsequently reacted with a compound containing an alkoxysilane group and a secondary amino group and optionally a low molecular weight, isocyanate-reactive chain extender in the second step to form the polyurethane/urea either before, during or after being mixed with an aqueous medium. The NCO prepolymer is preferably prepared by reacting an organic polyisocyanate with a high molecular weight polyol, an isocyanate-reactive compound containing hydrophilic groups and optionally a low molecular weight polyol.

The polyurethane/ureas may be dispersed in water by either the inverse process or the direct process. In the direct process water is added to the polymer to initially form a water-in-oil emulsion, which after passing through a viscosity maximum, is converted into an oil-in-water emulsion. In the inverse process the polymer is added to water, which avoids the need to pass through the viscosity maximum.

Even though more energy is required for preparing a dispersion by the direct process, it may be necessary to use this process if the viscosity of the polymer is too high to add it to water. A high viscosity polymer is often obtained when a fully reacted polyurethane/urea is prepared in the organic phase, especially when large amounts of solvent are not used to reduce the viscosity.

To obtain a suitable viscosity for using the inverse process without the use of large amounts of solvent, the NCO prepolymer can be dispersed in water and then reacted with the compound containing an alkoxysilane group and a secondary amino group and optionally with an amine chain extender. However, precautions should be taken when using water soluble compounds containing more than one alkoxysilane group because the alkoxysilane groups can hydrolyze upon addition to water and undergo a condensation reaction. Therefore, when using these compounds, it is preferred to react these compounds with the prepolymer before dispersion in water, preferably by the direct process.

In addition to the one-step process in which all of the components are reacted to form the polyurethane/urea in one step and the preferred two-step process previously set forth, it is also possible to incorporate the compounds containing alkoxysilane groups and secondary amino groups into the NCO prepolymers, which are then chain extended with polyamine chain extenders or crosslinking agents in known manner.

Any of the known starting materials for preparing polyurethane/urea dispersions may be used for preparing the dispersions according to the invention, provided that sufficient isocyanate groups are reacted with compounds containing alkoxysilane groups and secondary amino groups to obtain the required alkoxysilane group content.

Suitable compounds containing alkoxysilane groups and secondary amino groups include those corresponding to the formula

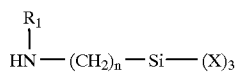

wherein

X represents identical or different organic groups which are inert to isocyanate groups below 100° C., provided that at least one of these groups is an alkoxy or acyloxy group, preferably alkyl or alkoxy groups having 1 to 4 carbon atoms and more preferably alkoxy groups, $R_1$ represents an organic group which is inert to isocyanate groups at a temperature of 100° C. or less, provided that $R_1$ is not a succinate group, preferably an alkyl, cycloalkyl or aromatic group having 1 to 12, preferably 1 to 8 carbon atoms, or a group corresponding to the formula

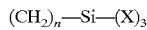

and n is an integer from 1 to 8, preferably 2 to 4 and more preferably 3.

Especially preferred are compounds in which X represents methoxy, ethoxy groups or propoxy groups, more preferably methoxy or ethoxy groups and most preferably methoxy groups, and n is 3.

Examples of suitable aminoalkyl alkoxysilanes of formula I include N-phenylaminopropyltrimethoxysilane (available as A-9669 from OSI Specialties, Witco), bis-(gamma-trimethoxysilylpropyl)amine (available as A-1170 from OSI Specialties, Witco), N-cyclohexylaminopropyltriethoxysilane, N-methylaminopropyltrimethoxysilane and the corresponding alkyl diethyoxy and dimethoxy silanes.

The compounds containing alkoxysilane groups and secondary amino groups are present in an amount sufficient to incorporate at least 0.5% by weight, preferably at least 1.0% by weight and more preferably at least 1.3% by weight, based on the weight of the polyurethane/ureas, of alkoxysilane groups (calculated as Si, MW 28). The upper limit is 6% by weight, preferably 4% and more preferably 3%, based on the weight of the polyurethane/ureas, of alkoxysilane groups (calculated as Si, MW 28).

Suitable polyisocyanates which may be used to prepare the polyurethane/ureas are known and include organic diisocyanates represented by the formula

in which R represents an organic group obtained by removing the isocyanate groups from an organic diisocyanate having a molecular weight of from about 112 to 1,000, preferably from about 140 to 400. Diisocyanates preferred for the process according to the invention are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polymethylene polyiso-cyanates obtained by phosgenating aniline/formaldehyde condensates may also be used.

Preferred diisocyanates bis-(4-isocyanatocyclohexyl)-methane, 1,6-hexamethylene diisocyanate and isophorone diisocyanate, especially bis-(4-isocyanatocyclohexyl)-methane and isophorone diisocyanate.

Organic compounds containing at least two isocyanate-reactive groups, which may be reacted with the previously described organic diisocyanates to prepare the NCO prepolymers, can be divided into two groups, i.e., high molecular weight compounds having molecular weights from 400 to about 6,000, preferably from 800 to about 3,000, and low molecular weight compounds (chain extenders) having molecular weights below 400. The molecular weights are number average molecular weights ($M_n$) and are determined by end group analysis (OH number). Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydro-phthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethyl-cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethlyolpropane. The polyesters may also contain a portion of carboxyl end groups. Polyesters of lactones, e.g., ε-caprolactone or hydroxycarboxylic acids, e.g. ω-hydroxycaproic acid, may also be used.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers which have been obtained by the reaction of starting compounds containing amine compounds can also be used, but are less preferred for use in the present invention. Examples of these polyethers as well as suitable polyhydroxy polyacetals, polyhydroxy polyacrylates, polyhydroxy polyester amides, polyhydroxy polyamides and polyhydroxy polythioethers are disclosed in U.S. Pat. No. 4,701,480, herein incorporated by reference.

While the presence of the previously described high molecular weight polyols is optional, they are preferably used in amount of at least 5%, more preferably at least 10% by weight, based on the weight of the polyurethane/urea. The maximum amount of these polyols is preferably 85%, more preferably 75% by weight, based on the weight of the polyurethane/urea.

The low molecular weight isocyanate-reactive component having an average molecular weight of up to 400 is selected from the polyhydric alcohols, preferably dihydric alcohols, which have previously been described for the preparation of the polyester polyols and polyether polyols, and the low molecular polyamines, preferably diamines, which are described hereinafter. Also suitable are aldimines as disclosed in U.S. Pat. No. 5,569,706, herein incorporated by reference.

In addition to the above-mentioned components which are preferably difunctional in the isocyanate polyaddition reaction, monofunctional and even small portions of trifunctional and higher functional components generally known in polyurethane chemistry, such as trimethylolpropane, may be used in special cases in which slight branching of the NCO prepolymer or polyurethane/urea is desired. However, the NCO prepolymers should be substantially linear and this may be achieved by maintaining the average functionality of the prepolymer starting components below about 2.1.

In order to enable the polyurethane/urea to be stably dispersed in an aqueous medium, ionic or potential ionic groups and/or lateral or terminal, hydrophilic ethylene oxide units are chemically incorporated into the polyurethane/urea. The ionic or potential ionic groups may be either anionic or cationic, preferably anionic. Examples of anionic groups include carboxylate and sulfonate groups, while examples of cationic groups include ammonium and sulfonium groups. The ionic groups are incorporated in an amount sufficient to provide an ionic group content of 0 to 200 milliequivalents per 100 g of polyurethane/urea. When the ionic or potential ionic groups are incorporated, they are preferably incorporated in an amount sufficient to provide an ionic group content of at least 10, preferably at least 20 milliequivalents per 100 g of polyurethane/urea. The upper limit for the content of ionic groups is preferably 180, more preferably 100 milliequivalents per 100 g of polyurethane/urea.

The content of hydrophilic ethylene oxide units may be up to about 10%, preferably up to about 8%, more preferably about 1 to 6% and most preferably about 2 to 6%, by weight, based on the weight of the polyurethane/urea. In addition, up to about 75% of the allowable, chemically incorporated, hydrophilic ethylene oxide units may be replaced by the known nonionic, external emulsifiers such as those of the alkaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

The ionic or potential ionic groups may be chemically incorporated into the NCO prepolymer or may be chemically incorporated through the chain extender which is used to form the polyurethane/urea from the prepolymer. Suitable compounds for incorporating these groups include i) monoisocyanates or diisocyanates which contain ionic or potential ionic groups and ii) compounds which are monofunctional or difunctional in the isocyanate-polyaddition reaction and contain ionic or potential ionic groups.

The ionic groups are formed by neutralizing the corresponding potential ionic groups either prior to, during or after formation of the polyurethane/urea. When the potential ionic groups are neutralized prior to their incorporation into the polyurethane/urea, the ionic groups are incorporated directly. When neutralization is performed subsequent to forming the polyurethane/urea, potential ionic groups are incorporated.

Suitable compounds for incorporating the carboxylate, sulfonate and quaternary nitrogen groups are described in U.S. Pat. Nos. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the NCO prepolymer are the diol sulfonic acids or the diol sulfonates disclosed in U.S. Pat. No. 4,108,814.

The neutralizing agents for converting the potential ionic groups to ionic groups are described in the preceding U.S. patents and are also discussed hereinafter. Within the context of this invention, the term "neutralizing agents" is meant to embrace all types of agents which are useful for converting potential ionic groups to ionic groups.

The preferred carboxylate groups for incorporation into polyurethane/urea in either the one-step or two-step process are derived from hydroxy-carboxylic acids of the general formula:

$$(HO)_xQ(COOH)_y$$

wherein
Q represents a straight or branched, hydrocarbon radical containing 1 to 12 carbon atoms, and
x and y represent values from 1 to 3.
Examples of these hydroxy-carboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula $$Q'-\underset{\underset{CH_2OH}{|}}{\overset{\overset{CH_2OH}{|}}{C}}-COOH$$

wherein Q' is hydrogen or an alkyl group containing 1 to 8 carbon atoms. The most preferred compound is a,a-dimethylol propionic acid, i.e., when Q' is methyl in the above formula.

When incorporating the anionic or potential anionic groups through the chain extender used to convert the NCO prepolymer to the polyurethane/urea in the second stage of the two-step process, it is preferred to use amino functional compounds containing anionic or potential anionic groups such as the diamino carboxylic acids or carboxylates disclosed in U.S. Pat. No. 3,539,483 or salts of 2,6-diaminohexanoic acid. When sulfonate groups are desired they may be incorporated through the chain extenders using salts of isethionic acid or preferably diamino sulfonates of the formula $$H_2N-A-NH-B-SO_3-$$

wherein
A and B represent aliphatic hydrocarbon radicals containing 2 to 6 carbon atoms, preferably ethylene groups.

Whether the ionic groups are incorporated into the polyurethane/urea via the prepolymer or the chain extender is not critical. Therefore, the ionic groups may exclusively be incorporated via the prepolymer or via the chain extender or a portion of the ionic groups may be introduced according to each alternative. However, it is preferred to introduce the ionic groups via the prepolymer since this allows a wider range of process variations in preparing the polyurethane/urea dispersion.

Suitable compounds for incorporating the lateral or terminal, hydrophilic ethylene oxide units may be either monofunctional or difunctional in the context of the isocyanate-polyaddition reaction and include i) diisocyanates which contain lateral, hydrophilic ethylene oxide units, ii) compounds which are difunctional in the isocyanate-polyaddition reaction and contain lateral, hydrophilic ethylene oxide units, iii) monoisocyanates which contain terminal, hydrophilic ethylene oxide units, iv) compounds which are monofunctional in the isocyanate-polyaddition reaction and contain terminal, hydrophilic ethylene oxide units, and v) mixtures thereof.

Examples of these compounds are disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example propylene oxide.

In the two-step process the NCO prepolymers are prepared by reacting the polyisocyanate component with the high molecular weight organic component containing at least two isocyanate-reactive groups, optionally the low molecular weight organic component containing at least two isocyanate-reactive groups and optionally the compounds containing at least one ionic group, at least one potential ionic group or hydrophilic ethylene oxide units. The ratio of isocyanate groups to isocyanate-reactive groups is maintained between about 1.1 to 5, preferably about 1.2 to 3 and most preferably about 1.3 to 2.0 on an equivalent basis. The above components may be reacted simultaneously or sequentially to produce the NCO prepolymer.

The reaction temperature during prepolymer production is normally maintained below about 150° C., preferably between about 50° and 130° C. The reaction is continued until the content of unreacted isocyanate groups decreases to the theoretical amount or slightly below. The finished prepolymer should have a free isocyanate content of about 1 to 20%, preferably about 1 to 10% by weight, based on the weight of prepolymer solids.

The prepolymers may be prepared in the presence of solvent provided that the solvent is substantially nonreactive in the context of the isocyanate-polyaddition reaction. Examples of suitable solvents include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons and mixtures thereof.

In addition to the preceding organic solvents, it is also possible to use silicon-containing reactive diluents as solvents during the production of the prepolymers and for the resulting coating compositions. Examples of these reactive diluents include tetramethoxy silane, tetraethoxy silane, methyl triethoxy silane, methyl trimethoxy silane, ethyl triethoxy silane, octyl triethoxy silane and dimethyl diethoxy silane.

The use of these reactive diluents provides two important benefits. First, the coating compositions contains less environmentally regulated organic solvent. Second, the reactive diluent is also a co-reactant for the polyurethane/urea dispersion and provides a composition with increased inorganic character. Coatings prepared from these compositions have different performance properties when compared to coatings prepared from compositions that do not contain these reactive diluents.

Suitable neutralizing or quaternizing agents for converting the potential anionic groups to anionic groups either before, during or after their incorporation into the polyurethane/ureas, are tertiary amines, alkali metal cations or ammonia. Examples of these neutralizing agents are disclosed in U.S. Pat. Nos. 4,501,852 and 4,701,480, which are incorporated by reference. Preferred neutralizing agents are the trialkyl-substituted tertiary amines and include triethyl amine, N,N-dimethyl-ethanol amine, triethanol amine and N-methyl-diethanol amine. Suitable neutralizing agents for converting potential cationic groups to cationic groups are disclosed in U.S. Pat. Nos. 3,479,310 and 3,419,533, which are incorporated by reference.

A sufficient amount of the potential ionic groups must be neutralized so that when combined with the hydrophilic ethylene oxide units and optional external emulsifiers, the polyurethane/urea final product will be a stable dispersion. Generally, at least about 75%, preferably at least about 90%, of the potential ionic groups are neutralized to the corresponding ionic groups.

The conversion of the potential ionic groups to ionic groups is conducted in known manner, e.g., as described in the preceding patents setting forth suitable neutralizing agents.

The NCO prepolymers may be converted into aqueous polyurethane/urea dispersions in accordance with the methods known in polyurethane chemistry and described, e.g., in "Waterborne Polyurethanes," Rosthauser et al, Advances in Urethane Science and Technology, Vol. 10, pg. 121–162 (1987).

According to one process for preparing the polyurethane/urea dispersions, the NCO prepolymer is prepared, chain extended and/or chain terminated to form a polyurethane/urea and subsequently dispersed in water. This process is disclosed in U.S. Pat. No. 3,479,310, herein incorporated by reference.

When amines are reacted with the NCO prepolymer either as chain terminators or chain extenders, a preferred method of reacting with the NCO prepolymers with amino group-containing compounds is by dispersing the prepolymer in water and then reacting the prepolymer with the amino group-containing compounds, which may be mixed with water either before, during or after dispersing the NCO prepolymer. The amino group-containing compounds are preferably a mixture containing a) 5 to 100 mole percent, based on the moles of amino group-containing compounds, of one or more compounds containing an alkoxysilane group and a secondary amino group and b) 0 to 90 mole percent, based on the moles of amino group-containing compounds, of amino group-containing compounds other than a).

Branching of the polyurethane/urea may be obtained by using compounds having an amine functionality of greater than 2 as component b).

In a preferred embodiment of the two-step process for preparing the aqueous polyurethane/urea dispersions of the present invention, the NCO prepolymers are reacted with components a) and b). While component b) may be selected from compounds containing one amino group, preferably component b) has an average amine functionality, i.e., the number of amine nitrogens per molecule, of about 2 to 6, more preferably about 2 to 4 and most preferably about 2 to 3. The desired functionalities can be obtained by using mixtures of polyamines.

Suitable amines are essentially hydrocarbon polyamines containing 2 to 6 amine groups which have isocyanate-reactive hydrogens according to the Zerewitinoff test, e.g., primary or secondary amine groups. The polyamines are generally aromatic, aliphatic or alicyclic amines and contain 1 to 30 carbon atoms, preferably 2 to 15 carbon atoms, and more preferably 2 to 10 carbon atoms. These polyamines may contain additional substitutents provided that they are not as reactive with isocyanate groups as the primary or secondary amines.

Examples of polyamines for use as component b) include those disclosed in U.S. Pat. No. 4,408,008, herein incorporated by reference. Preferred polyamines include ethylene diamine, 1,6-hexane diamine, 1,2- and 1,3- propane diamine, the isomeric butane diamines, 1-amino-3-aminomethyl-3,5,5-trimethyl cyclohexane, bis-(4-aminocyclohexyl)-methane, bis-(4-amino-3-methylcyclohexyl)-methane, xylylene diamine, $\alpha,\alpha,\alpha',\alpha'$-tetramethyl-1,3- and/or -1,4-xylylene diamine, 1-amino-1-methyl-4(3)-aminomethyl cyclohexane, 2,4- and/or 2,6-hexahydrotoluylene diamine, hydrazine, diethylene triamine, tiethylene tetramine, tetraethylene pentamine, pentaethylene hexamine.

Especially preferred are 1-amino-3-aminomethyl-3,5,5-trimethyl-cyclohexane (isophorone diamine or IPDA), bis-(4-amino-cyclohexyl)-methane, bis-(4-amino-3-methylcyclohexyl)-methane, 1,6-diaminohexane, hydrazine, diethylene triamine, triethylene tetramine, tetraethylene pentamine and pentaethylene hexamine.

The amount of amino group-containing compounds to be used in accordance with the present invention is dependent upon the number of isocyanate groups in the prepolymer. Generally, the ratio of isocyanate groups amino groups is 1.0:0.6 to 1.0:1.1, preferably 1.0:0.8 to 1.0:0.98 on an equivalent basis.

The reaction between the NCO prepolymer and the amino group-containing compounds is generally conducted at temperatures of 5 to 90° C., preferably 20 to 80° C., and more preferably 30 to 60° C. The reaction conditions are normally maintained until the isocyanate groups are essentially completely reacted.

The final product is a stable, aqueous dispersion of polyurethane/urea particles having a solids content of up to 60% by weight, preferably 15 to 60% by weight and more preferably 30 to 45% by weight. However, it is always possible to dilute the dispersions to any minimum solids content desired. The average particle size of the polyurethane-ureas is generally below 1.0 micron, preferably 0.001 to 0.5 microns and more preferably 0.01 to 0.3 microns. The small particle size enhances the stability of the dispersed particles and also leads to the production of films with high surface gloss.

The dispersions may be blended with other dispersions or with other known additives such as fillers, plasticizers, pigments, carbon black, silica sols and the known levelling agents, wetting agents, antifoaming agents and stabilizers.

In order to improve the chemical and abrasion resistance and hardness of the dispersions according to the invention, they may be blended with colloidal silica in amounts of up to 70% based on the weight of the resulting composition. The improvement is believed to be due to the fact that the colloidal silica contains polysilicon dioxide with Si—OH radicals on the surface of each particle. These Si—OH radicals can react with silanes so that a chemical bond exists between the inorganic modified organic matrix and the silica particle. It is believed that this imparts a character to the film, not unlike an elastomer, where hard domains are surrounded by a soft continuous phase. Suitable examples of colloidal silica include those having various particle sizes and surface treatments, such as sodium or ammonium hydroxide. Examples of surface treatments include alkali or acid washing. Alkali washing is preferred for polyurethane/ureas containing anionic groups and acid washing is preferred for polyurethane/ureas containing cationic groups.

The aqueous polyurethane/urea dispersions are suitable for coating and impregnating woven and nonwoven textiles, leather, paper, wood, metals, ceramics, stone, concrete, bitumen, hard fibers, straw, glass, porcelain, plastics of a variety of different types, glass fibers for antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

Drying of the products obtained by various application techniques may be carried out either at room temperature or at elevated temperature. When the products are cured, water evaporates and the silane groups react with one another to form Si—O—Si linkages, which provide additional crosslinking. For this reason the molecular weight of the products does not have to as high as prior art products to attain similar performance levels. This means that the viscosity of the polyurethane/urea is lower, which means that higher solids products can be obtained or less solvent is necessary.

In the following examples all parts and percentages are by weight unless otherwise specified.

EXAMPLES

The following ingredients were used in the examples:
Polyol 1
 A polyester diol prepared from 1,6-hexanediol, neopentyl glycol and adipic acid, number average molecular weight—1700, molar ratio of glycols 65:35.
The following abbreviations were used in the examples:
Isocyanates:
IPDI isophorone diisocyanate
Chain extenders:
NPG neopentyl glycol
Solubilizing agents:
DMPA α,α-dimethylol propionic acid
Catalyst:
DBTDL dibutyltin dilaurate
Neutralizing agents:
TEA: triethyl amine
Silane amines:
APS 3-aminopropyltrimethoxysilane (available as A-1110 from OSI Specialties, Witco)
PAPS N-phenylaminopropyltrimethoxysilane (available as A-9669 from OSI Specialties, Witco)
BSPA Bis-(gamma-trimethoxysilylpropyl)amine (available as A-1170 from OSI Specialties, Witco)
Solvents:
NMP N-methyl-2-pyrrolidinone
Other:
PUD polyurethane dispersion
RS resin solids
Preparation of Silane PUD 1
 A prepolymer was prepared in a 1 liter reaction flask equipped with a heating mantel, condenser, stirring blade, nitrogen inlet and thermometer equipped with the temperature controller. 85.6 g of polyol 1, 4.7 g of neopentyl glycol (NPG), 11.2 g of 2,2'-bis(hydroxymethyl) propionic acid (DMPA), and 47.5 g of N-methylpyrrolidinone (NMP) were mixed together and heated to 80° C. to melt and homogenize the mixture. 55.9 g of IPDI were added to the mixture in one portion. 0.16 g of dibutyl tin dilaurate were added to the mixture. The mixture was allowed to react at 80° C. for 2 hours. Then 32.5 g of N-phenylaminopropyltrimethoxysilane (PADS) were added and the prepolymer was heated at 80° C. for 15 min. 8.5 g of triethylamine were added, which is sufficient to neutralize 100% of the acid groups. The neutralized mixture was stirred at 70° C. for 10 min. 296.6 g of room temperature water was added to the prepolymer (i.e., the direct process) under high shear. The high shear and temperature of 60° C. were maintained for 1 hour to yield a stable, clear dispersion.

The chemical composition and properties of the dispersion are set forth in Table 1.
Preparation of Silane PUD 2
 A silane PUD was prepared following the procedure used to prepare silane PUD 1 with the exception that bis-(gamma-trimethoxysilylpropyl)amine (BSPA) was in place of N-phenylaminopropyltrimethoxysilane (PADS). The resulting silane PUD was a translucent, stable dispersion, which had a higher Si content than silane PUD 1.

The chemical composition and properties of the dispersion are set forth in Table 1.
Preparation of Silane PUD 3—Comparison
 A silane PUD was prepared following the procedure used to prepare silane PUD 1 with the exception that 3-aminopropyltrimethoxysilane (APS), which contains a primary amino group, was used in place of N-phenylaminopropyltrimethoxysilane (PADS). The prepolymer immediately agglomerated upon addition of water.

This example demonstrates that it is possible to incorporate higher amounts of silane groups by incorporating these groups via secondary amino groups as opposed to the primary amino groups exemplified by the prior art in U.S. Pat. No. 5,554,686.
Preparation of Silane PUD 4—Comparison
 A silane PUD was prepared following the procedure used to prepare silane PUD 3 except that 1) the aminosilane and neutralizing agent were mixed with water instead of reacting them with the prepolymer and 2) the prepolymer was added to the mixture of water, aminosilane and neutralizing agent (i.e., the inverse process) instead of adding this mixture to the prepolymer. After the addition of the prepolymer to water, the mixture gelled.

The chemical composition and properties of the dispersion are set forth in Table 1.

This example demonstrates that even when silane PUD 3 was prepared using the inverse process disclosed in U.S. Patent 5,554,686, a gelled product was obtained.
Preparation of Silane PUD 5
 A silane PUD was prepared following the procedure used to prepare silane PUD 4 with the exception that N-phenylaminopropyltrimethoxysilane (PADS) was used in place of 3-aminopropyltrimethoxysilane (APS). The resulting silane PUD was a translucent, stable dispersion.

The chemical composition and properties of the dispersion are set forth in Table 1.
Preparation of Silane PUD 6
 A silane PUD was prepared following the procedure used to prepare silane PUD 4 with the exception that bis-(gamma-trimethoxysilylpropyl)amine (BSPA) was used in place of 3-aminopropyltrimethoxysilane (APS). Gelation occurred when the aminosilane was added to water, i.e., before the addition of the prepolymer, due to the hydrolysis of the alkoxysilane groups in the presence of water and the subsequent condensation reaction.

This example demonstrates that when using water soluble compounds containing more than one alkoxysilane group, the silane PUD should preferably take place according to the direct process as shown in Example 2.

The chemical composition and properties of the dispersion are set forth in Table 1.

TABLE 1

Silane PUD's 1–6

| | Direct Process | | | Inverse Process | | |
|---|---|---|---|---|---|---|
| Ingredients | 1 | 2 | 3 Comp | 4 Comp | 5 | 6 Comp |
| IPDI | 55.9 | 55.9 | 55.9 | 55.9 | 55.9 | 55.9 |
| Polyol 1 | 85.6 | 85.6 | 85.6 | 85.6 | 85.6 | 85.6 |
| NPG | 4.7 | 4.7 | 4.7 | 4.7 | 4.7 | 4.7 |
| DMPA | 11.2 | 11.2 | 11.2 | 11.2 | 11.2 | 11.2 |
| DBTDL | 0.16 | 0.16 | 0.16 | 0.16 | 0.16 | 0.16 |
| TEA | 8.5 | 8.5 | 8.5 | 6.8 | 8.5 | 8.5 |
| APS | | | 22.8 | 13.8 | | |
| PAPS | 32.5 | | | | 32.5 | |
| BSPA | | 50.0 | | | | 50.0 |
| NMP | 47.5 | 50.0 | 27.0 | 36.1 | 47.5 | 50.0 |
| $H_2O$ | 296.6 | 312.7 | 236.4 | 205.0 | 296.6 | 312.7 |
| Si Content, % | 2.0 | 4.1 | 2.0 | 1.3 | 2.0 | 4.1 |
| NCO/NH + OH | 1.03 | 1.03 | 1.03 | 1.15 | 1.03 | 1.03 |
| RS, % | 35.0 | 35.0 | 40.0 | 40.0 | 35.0 | 35.0 |
| % NMP on Total Disp | 8.8 | 8.8 | 6.0 | 8.6 | 8.8 | 8.8 |
| % COOH on RS | 2.0 | 1.9 | 2.1 | 2.2 | 2.0 | 1.9 |
| Appearance | clear | translucent | gelled | gelled | translucent | gelled |
| Viscosity mPa · s at 25° C. | 315 | 210 | — | — | — | — |
| pH | 8.3 | 8.3 | — | — | — | — |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane/urea dispersion wherein the polyurethane/ureas contain 1.0. to 6% by weight, based on the weight of the polyurethane/ureas, of alkoxysilane groups (calculated as Si, MW 28), which have been incorporated by the reaction of isocyanate groups with a compound containing at least one alkoxysilane group and at least one secondary amino group other than an aspartate group.

2. The dispersion of claim 1 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

3. The dispersion of claim 2 wherein at least about 80% of said anionic groups are carboxylate groups neutralized with tertiary amines.

4. The dispersion of claim 1 wherein said polyurethane/ureas contain 10 to 120 milliequivalents per 100 grams of polyurethane/ureas of chemically incorporated cationic groups and up to about 10% by weight, based on the weight of said polyurethanelureas, of lateral and/or terminal hydrophilic chains containing ethylene oxide units..

5. A coating prepared from the aqueous polyurethane/urea dispersion of claim 1.

6. The dispersion of claim 1 that contains 1.3 to 6% by weight, based on the weight of the polyurethane/ureas, of alkoxysilane groups.

7. The dispersion of claim 2 that contains 1.3 to 6% by weight, based on the weight of the polyurethane/ureas, of alkoxysilane groups.

8. The dispersion of claim 3 that contains 1.3 to 6% by weight, based on the weight of the polyurethane/ureas, of alkoxysilane groups.

9. The dispersion of claim 4 that contains 1.3 to 6% by weight, based on the weight of the polyurethane/ureas, of alkoxysilane groups.

10. An aqueous polyurethane/urea dispersion wherein the polyurethanelureas contain 1.0 to 6% by weight, based on the weight of the polyurethane/ureas, of alkoxysilane groups (calculated as Si, MW 28), which have been incorporated by the reaction of isocyanate groups with a compound corresponding to the formula

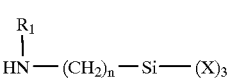

wherein

X represents identical or different organic groups which are inert to isocyanate groups below 100° C., provided that at least one of these groups is an alkoxy or acyloxy group, $R_1$ represents an organic group which is inert to isocyanate groups at a temperature of 100° C. or less, provided that $R_1$ is not a succinate group, a methyl group or a group corresponding to the formula

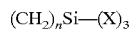

and n is an integer from 1 to 8.

11. The dispersion of claim 10 wherein said polyurethane/ureas contain 10 to 120 milliequivalents, per 100 grams of polyurethane/ureas, of chemically incorporated anionic groups and up to about 10% by weight, based on the weight of said polyurethane/ureas, of lateral and/or terminal hydrophilic chains containing ethylene oxide units.

12. The dispersion of claim 11 wherein at least about 80% of said anionic groups are carboxylate groups neutralized with tertiary amines.

13. The dispersion of claim 10 wherein said polyurethane/ureas contain 10 to 120 milliequivalents per 100 grams of polyurethane/ureas of chemically incorporated cationic groups and up to about 10% by weight, based on the weight of said polyurethane/ureas, of lateral and/or terminal hydrophilic chains containing ethylene oxide units.

14. The dispersion of claim 10 that contains 1.3 to 6% by weight, based on the weight of the polyurethane/ureas, of alkoxysilane groups.

15. The dispersion of claim 11 that contains 1.3 to 6% by weight, based on the weight of the polyurethane/ureas, of alkoxysilane groups.

16. The dispersion of claim 12 that contains 1.3 to 6% by weight, based on the weight of the polyurethane/ureas, of alkoxysilane groups.

17. The dispersion of claim 13 that contains 1.3 to 6% by weight, based on the weight of the polyurethane/ureas, of alkoxysilane groups.

* * * * *